United States Patent
Yamada

(10) Patent No.: US 11,893,050 B2
(45) Date of Patent: Feb. 6, 2024

(54) SUPPORT DEVICE, SUPPORT METHOD AND SUPPORT PROGRAM

(71) Applicant: Nippon Telegraph and Telephone Corporation, Tokyo (JP)

(72) Inventor: Takeshi Yamada, Musashino (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 118 days.

(21) Appl. No.: 17/624,769

(22) PCT Filed: Jul. 17, 2019

(86) PCT No.: PCT/JP2019/028177
§ 371 (c)(1),
(2) Date: Jan. 4, 2022

(87) PCT Pub. No.: WO2021/009886
PCT Pub. Date: Jan. 21, 2021

(65) Prior Publication Data
US 2022/0253469 A1    Aug. 11, 2022

(51) Int. Cl.
*G06F 16/30* (2019.01)
*G06F 16/33* (2019.01)
*G06F 16/93* (2019.01)

(52) U.S. Cl.
CPC ............ *G06F 16/334* (2019.01); *G06F 16/93* (2019.01)

(58) Field of Classification Search
CPC ....... G06F 16/334; G06F 16/383; G06F 16/93
See application file for complete search history.

(56) References Cited

U.S. PATENT DOCUMENTS

| | | | | |
|---|---|---|---|---|
| 2006/0248440 A1* | 11/2006 | Rhoads | ................. | G06F 16/951 715/236 |
| 2010/0293447 A1 | 11/2010 | Kadowaki et al. | | |
| 2020/0257709 A1* | 8/2020 | Bull | ........................ | G06F 16/31 |
| 2021/0056304 A1* | 2/2021 | Mikami | .................. | G06F 40/30 |

FOREIGN PATENT DOCUMENTS

| | | |
|---|---|---|
| JP | 2010267019 | 11/2010 |
| JP | 2018018373 | 2/2018 |

OTHER PUBLICATIONS

Article entitled "Are Cited References Meaningful? Measuring Semantic Relatedness in Citation Analysis", by Alam et al., dated 2017 (Year: 2017).*
Article entitled "Citances: Citation Sentences for Semantic Analysis of Bioscience Text", by Nakov et al., dated Jan. 2004 (Year: 2004).*

* cited by examiner

*Primary Examiner* — Mahesh H Dwivedi
(74) *Attorney, Agent, or Firm* — Fish & Richardson P.C.

(57) ABSTRACT

In assistance processing for assisting in describing a document corresponding to a portion in a document, a calculation unit calculates a similarity degree between a sentence in a document and a document described correspondingly to a portion in the document. When the calculated similarity degree is equal to or greater than a predetermined threshold, an extraction unit extracts the sentence in the document in association with the document described correspondingly to the portion in the document.

6 Claims, 8 Drawing Sheets

SUPPORT DEVICE, SUPPORT METHOD AND SUPPORT PROGRAM

CROSS-REFERENCE TO RELATED APPLICATIONS

This application is a National Stage application under 35 U.S.C. § 371 of International Application No. PCT/JP2019/028177, having an International Filing Date of Jul. 17, 2019. The disclosure of the prior application is considered part of the disclosure of this application, and is incorporated in its entirety into this application.

TECHNICAL FIELD

The present invention relates to an assistance apparatus, an assistance method, and an assistance program.

BACKGROUND ART

In recent years, there has been studied a technology in which test items for development requirements are automatically extracted from a document such as a design document written by a non-engineer using a natural language (see PTL 1). The technology uses, for example, a technique of machine learning such as conditional random fields (CRF) to impart a tag to an important description portion in a design document, such as a target device, an input, an output, a state, or a checkpoint, and automatically extract a test item from a range of the imparted tag. In that case, machine learning is performed using the design document in which the tag is imparted as teacher data, so that a tag is automatically imparted to a design document.

CITATION LIST

Patent Literature

PTL 1: JP 2018-018373 A

SUMMARY OF THE INVENTION

Technical Problem

However, in the related art, when there are similar descriptions in a plurality of portions in a design document, relevant similar tags are formally imparted to the plurality of portions, which may make it difficult to determine descriptions in ranges of the substantially identical tag. As a result, it may be difficult to extract a test item appropriately from the ranges to which the tag has been imparted.

The present invention has been made in light of the foregoing, and an object of the present invention is to determine descriptions in ranges to which a substantially identical tag is imparted in a document.

Means for Solving the Problem

In order to solve the above-described problem and achieve the object, an assistance apparatus according to an aspect of the present invention is an assistance apparatus for assisting in describing a document corresponding to a portion in a document, the assistance apparatus including: a calculation unit configured to calculate a similarity degree between a sentence of a document and a document described correspondingly to a portion of the document; and an extraction unit configured to extract the sentence of the document in association with the document described correspondingly to the portion in the document when the similarity degree calculated is equal to or greater than a predetermined threshold.

Effects of the Invention

According to the present invention, it is possible to determine descriptions in ranges to which a substantially identical tag is imparted in a document.

DESCRIPTION OF EMBODIMENTS

Hereinafter, an embodiment of the present invention will be described in detail with reference to the drawings. Note that the present invention is not limited by the embodiment. Note that in description of the drawings, the same components are denoted by the same reference signs.

Processing of System

Figure 1:
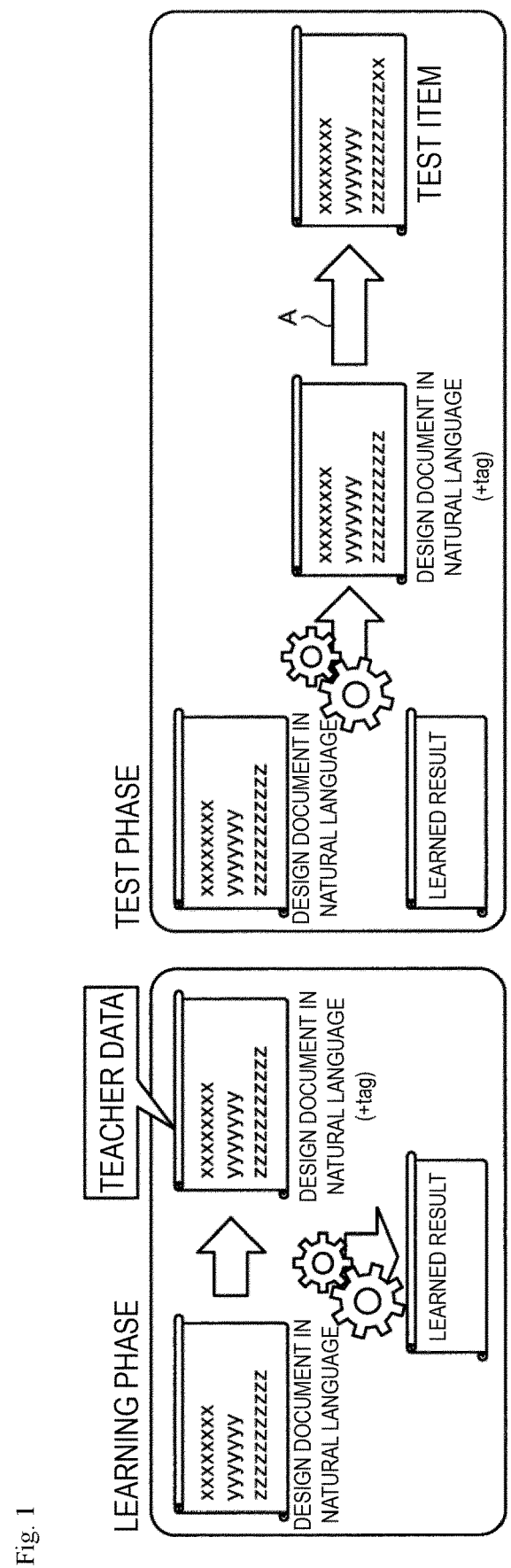
FIG. 1 is a diagram for explaining a summary of processing of a system including an assistance apparatus according to a present embodiment.
Figure 2:
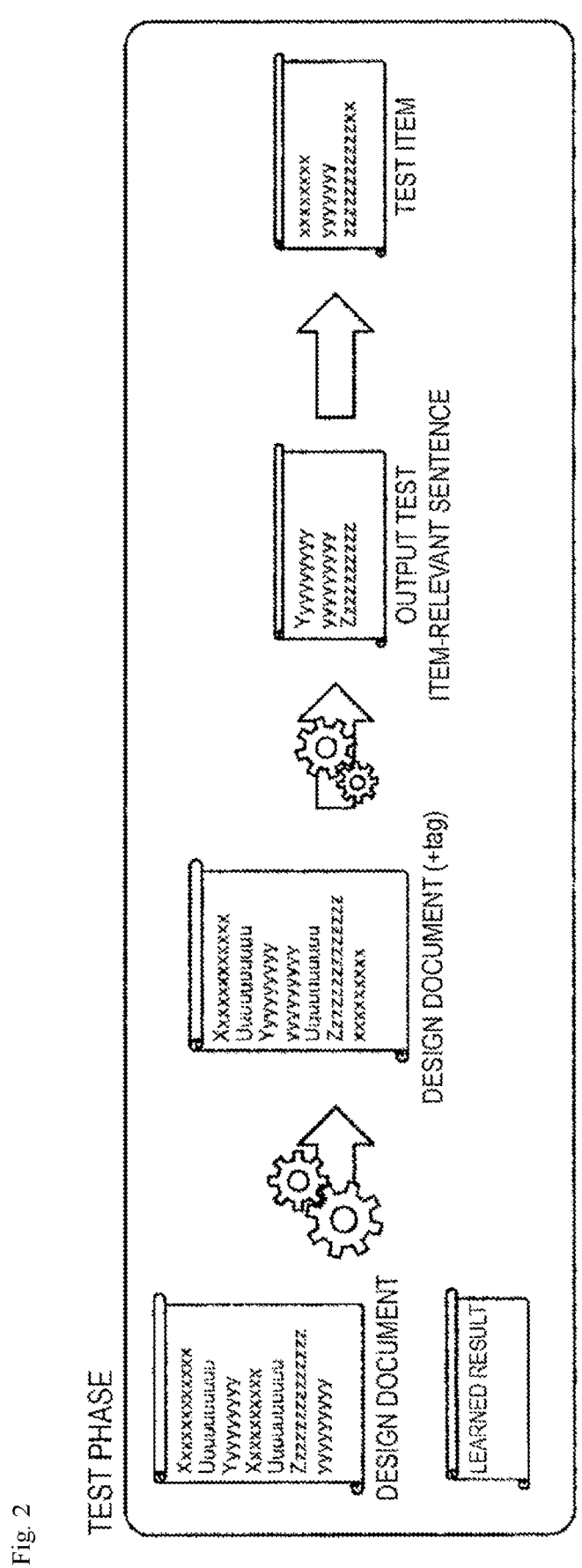
FIG. 2 is a diagram for explaining the summary of the processing of the system including the assistance apparatus according to the present embodiment.

FIGS. 1 and 2 are diagrams for explaining a summary of processing of a system including an assistance apparatus according to the present embodiment. The system including the assistance apparatus according to the present embodiment performs test item extraction processing. First, as illustrated in FIG. 1, the system imparts a tag to an important description portion in a document such as a design document written in a natural language. This important portion indicates development requirements and the like such as a target device, an input, an output, a state, and a checkpoint. The system then automatically extracts a test item from a range indicated by the tag in the document (see PTL 1).

Specifically, in a learning phase, the system performs machine learning using as teacher data the document in which the tag is imparted to an important description portion to learn a tendency of imparting the tag in the teacher data by stochastic calculation, and outputs the calculated tendency as a learned result. For example, the system learns the tendency of imparting the tag from a location and a type of the tag, words before and after the tag, a context, and the like.

In a test phase, the system uses the learned result that is obtained in the learning phase and indicates the tendency of imparting the tag in the teacher data to automatically impart a tag to a document to be subjected to the test item extraction processing of extracting a test item. The system then automatically extracts the test item from a range to which the tag has been imparted in the document.

Here, in processing of the test phase illustrated by A in FIG. 1, when there are similar descriptions in a plurality of portions in a document, a plurality of relevant similar tags are imparted. In that case, it is difficult to automatically extract an identical test item from the ranges of the plurality of tags. Thus, as illustrated in FIG. 2, in the test phase, the assistance apparatus according to the present embodiment determines, for each test item corresponding to an imparted tag, sentences (relevant sentences) in a design document that are related to the test item, and groups and outputs the determined sentences as relevant sentences of the identical test item. This allows the system to automatically extract the test item from the grouped test item-relevant sentences.

Thus, the assistance apparatus uses a similarity degree to an identical test item to measure a similarity degree between sentences in a document, thereby determining descriptions in ranges to which a substantially identical tag should be imparted. In this way, the assistance apparatus assists in extracting an appropriate test item from the ranges to which the tag is imparted in the document.

Configuration of Assistance Apparatus

Figure 3:
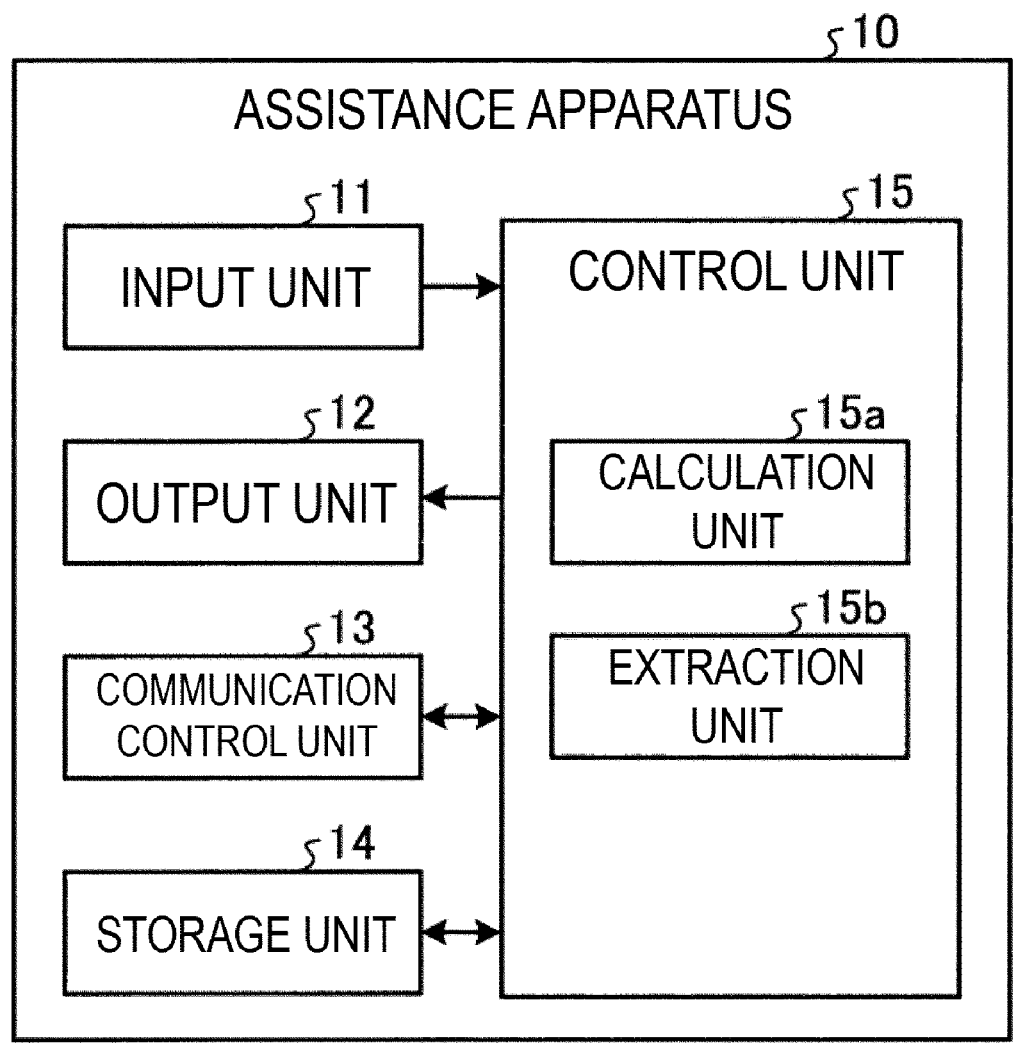
FIG. 3 is a schematic diagram illustrating a schematic configuration of the assistance apparatus according to the present embodiment.

FIG. 3 is a schematic diagram illustrating a schematic configuration of the assistance apparatus according to the present embodiment. As illustrated as an example in FIG. 3, an assistance apparatus 10 according to the present embodiment is implemented by a general-purpose computer such as a personal computer and includes an input unit 11, an output unit 12, a communication control unit 13, a storage unit 14, and a control unit 15.

The input unit 11 is implemented using an input device such as a keyboard or a mouse and inputs various kinds of instruction information such as instruction information for starting processing to the control unit 15 in response to an operation input by an operator. The output unit 12 is implemented by a display device such as a liquid crystal display or a printing device such as a printer. For example, the output unit 12 displays a result of assistance processing, which will be described below.

The communication control unit 13 is implemented by a network interface card (NIC) or the like and controls communication between the control unit 15 and an external apparatus via an electric communication line such as a local area network (LAN) or the Internet. For example, the communication control unit 13 controls communication of the control unit 15 with a management device that manages a document related to development such as a design document, a test item, and the like, an imparting device that automatically imparts a tag in a document, an extraction device that extracts a test item from a range to which a tag is imparted in a document, or the like.

The storage unit 14 is implemented by a semiconductor memory element such as a random access memory (RAM) or a flash memory or a storage device such as a hard disk or an optical disc. A processing program for causing the assistance apparatus 10 to operate, data used during execution of the processing program, and the like are stored in the storage unit 14 in advance, or are temporarily stored every time processing is performed. Note that the storage unit 14 may be configured to communicate with the control unit 15 via the communication control unit 13.

The control unit 15 is implemented using a central processing unit (CPU) or the like and executes the processing program stored in the memory. Accordingly, the control unit 15 functions as a calculation unit 15a and an extraction unit 15b as illustrated as an example in FIG. 3. Note that these functional units may be installed on different pieces of hardware. Moreover, the control unit 15 may include other functional units.

The calculation unit 15a calculates a similarity degree between a sentence in a document and a document described correspondingly to a portion of the document. For example, the calculation unit 15a acquires, via the input unit 11 or the communication control unit 13, a design document in which a tag has been imparted, and a test item corresponding to the tag. Furthermore, for each test item corresponding to an imparted tag, the calculation unit 15a calculates a similarity degree between a sentence in a design document and the test item.

Specifically, the calculation unit 15a calculates the similarity degree using a frequency of appearance of a word appearing in the sentence of the document and a frequency of appearance of a word appearing in the document described correspondingly to a portion of the document. For example, the calculation unit 15a calculates a similarity degree between a frequency of appearance of a word appearing in each sentence in a design document and a frequency of appearance of a word appearing in a test item.

Figure 4:
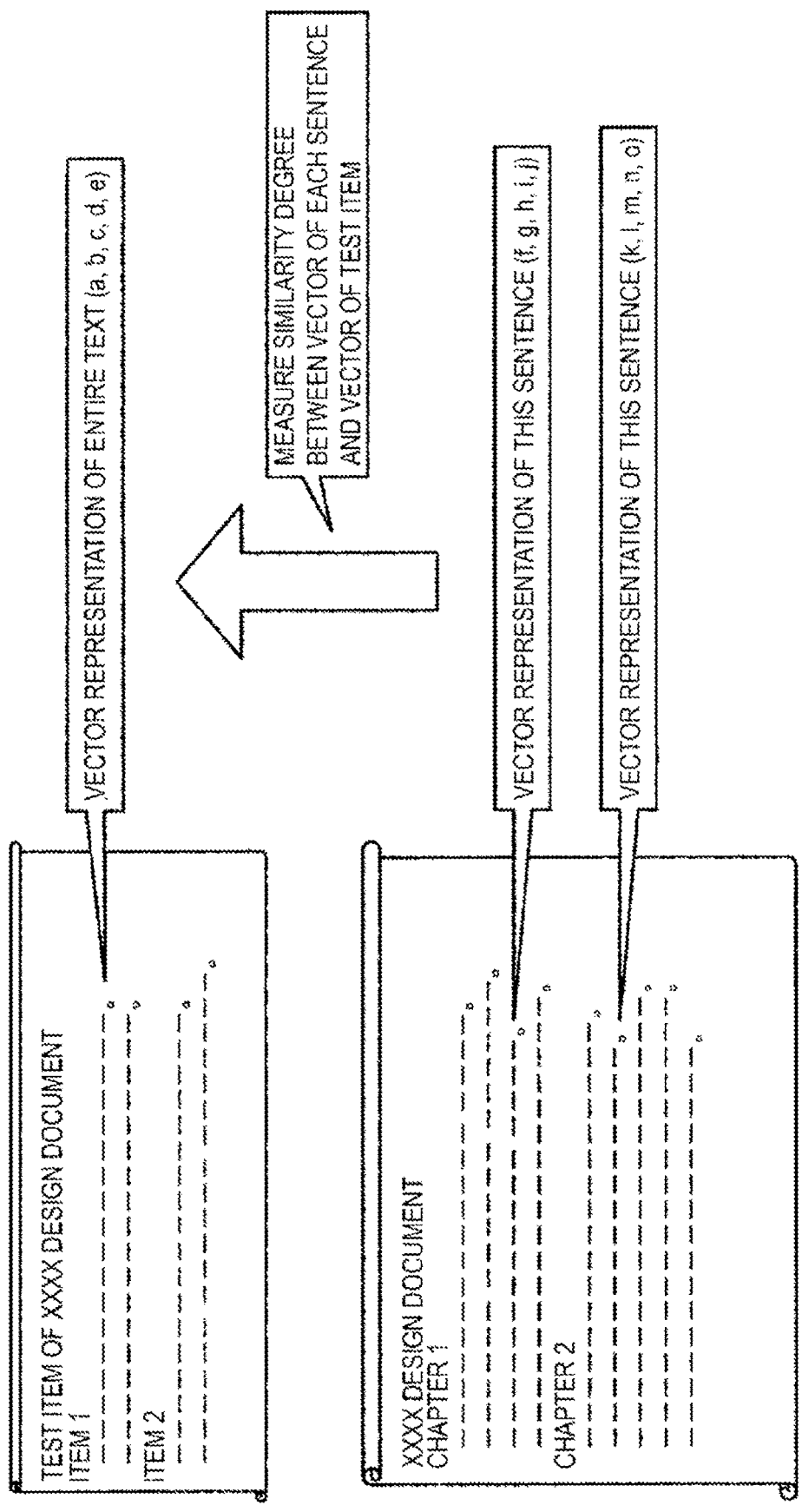
FIG. 4 is a diagram for explaining processing of a calculation unit.
Figure 5:
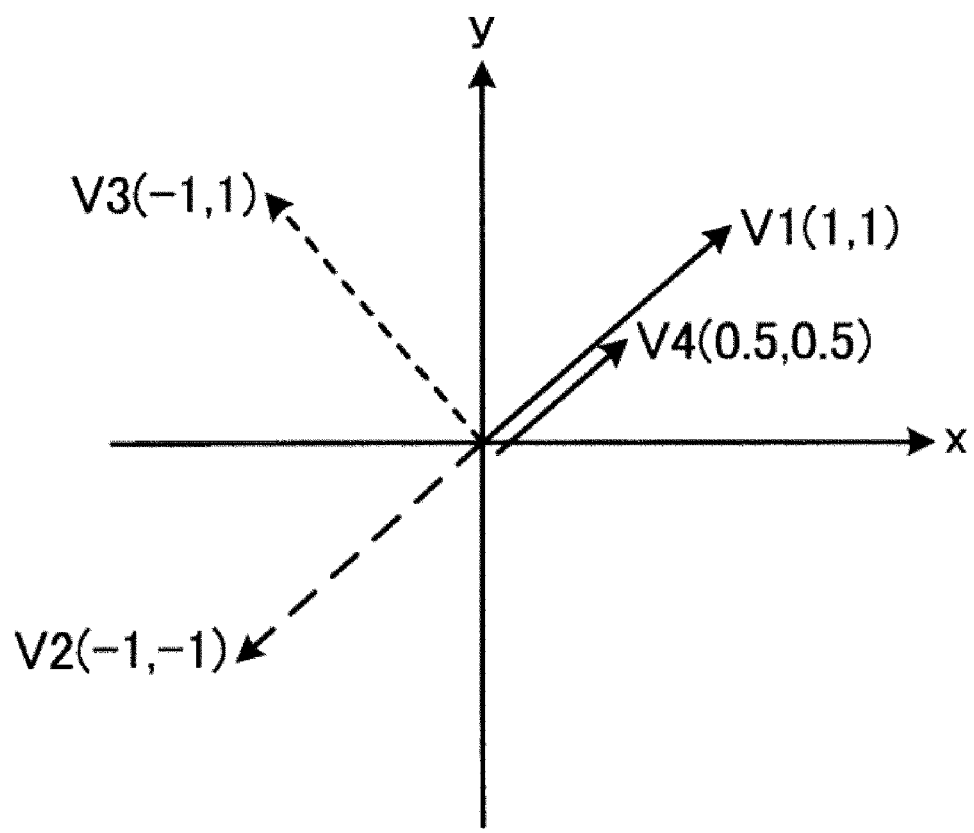
FIG. 5 is a diagram for explaining the processing of the calculation unit.

Here, FIGS. 4 and 5 are diagrams for explaining processing of the calculation unit 15a. As illustrated in FIG. 4, the calculation unit 15a uses vector representation representing characteristics of a document to calculate a similarity degree between each sentence in the design document and test items. As to this vector, each word in the document is a component, and a frequency of appearance of each word is a magnitude of the component.

In an example illustrated in FIG. 4, characteristics of each of the test items are represented by vector representation (a, b, c, d, e) of the entire text included in the test item. Then, for example, the calculation unit 15a calculates a similarity degree between a sentence represented by vector representation (f, g, h, i, j) in the design document and each of the test items.

In this case, for example, the calculation unit 15a calculates a cosine similarity degree of the vector described above as the similarity degree. Here, the cosine similarity degree is calculated using the internal product of the vectors, as expressed by Equation (1) below, and corresponds to a correlation coefficient of the two vectors.

[Math. 1]

$$\cos(\overline{V_x}, \overline{V_y}) = \frac{\overline{V_x} \cdot \overline{V_y}}{|V_x||V_y|} \quad (1)$$

The cosine similarity degree between a vector V1(1, 1) and a vector V2(−1, −1) having an angle of 180 degrees with respect to V1 illustrated in FIG. 5 is calculated to be −2. The cosine similarity degree between V1 and vector V3(−1, 1) having an angle of 90 degrees with respect to V1 is calculated to be 0. The cosine similarity degree between V1 and vector V4(0.5, 0.5) having an angle of 0 degrees with respect to V1 is calculated to be 0.5. In this way, the more similar the two vectors are, the greater the value of the cosine similarity degree is.

A description will be given with reference to FIG. 3 again. When the calculated similarity degree is equal to or greater than a predetermined threshold, the extraction unit 15b extracts the sentence in the document in association with the document described correspondingly to the portion of the document. Specifically, when the calculated similarity degree is equal to or greater than the predetermined threshold, the extraction unit 15b extracts, as a relevant sentence of the test item, the sentence in the design document in association with the test item.

Figure 6:
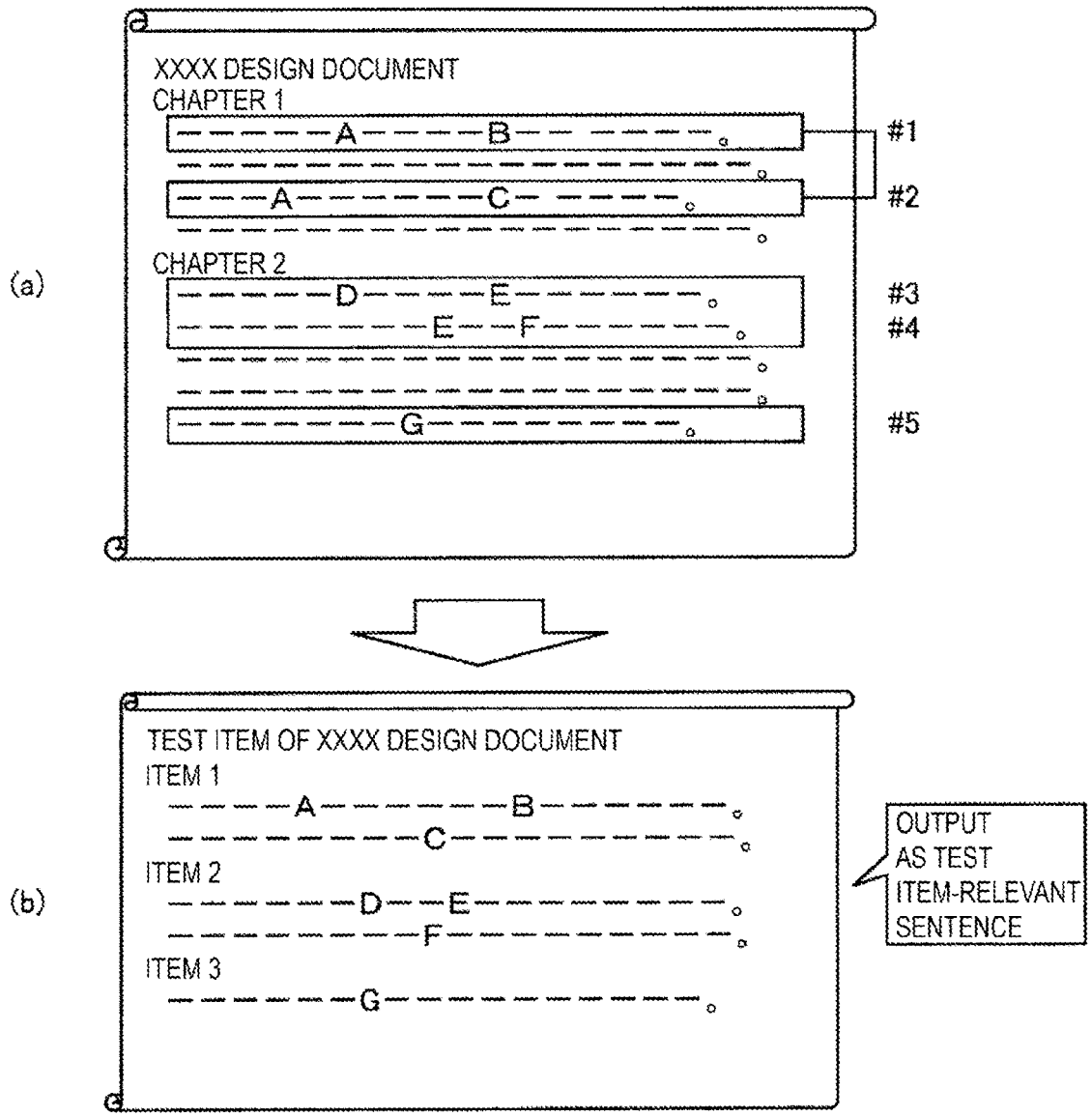
FIG. 6 is a diagram for explaining processing of an extraction unit.

Here, FIG. 6 is a diagram for explaining processing of the extraction unit 15b. In an example illustrated in FIG. 6, for example, the extraction unit 15b extracts a sentence #5 in the design document as a relevant sentence of an item 3 of the test items.

Furthermore, when similarity degrees between a plurality of sentences in a document and a document described correspondingly to a portion in the document are equal to or greater than the predetermined threshold, the extraction unit 15b groups the plurality of sentences and outputs the grouped plurality of sentences. For example, even for a plurality of sentences written separately in a design document, when their similarity degrees to an identical test item are equal to or greater than a predetermined threshold, the extraction unit 15b groups and outputs the plurality of sentences as relevant sentences of the identical test item.

In the example illustrated in FIG. 6, for example, the extraction unit 15b also extracts a sentence #3 and a sentence #4 continuing in the design document as relevant sentences of an item 2 of the test items. The extraction unit 15b also extracts a sentence #1 and a sentence #2 that include an overlapping description A and are written separately from each other in the design document as relevant sentences of an item 1 of the test items.

In this manner, the extraction unit 15b extracts a relevant sentence in the design document for each test item corresponding to a tag and outputs the extracted sentence as a test item-relevant sentence. This allows for a collective extraction of ranges to which a substantially identical tag should be imparted, that is, relevant sentences corresponding to an identical test item, even when there are similar descriptions in a plurality of portions in a document and a plurality of relevant similar tags have been automatically imparted.

In addition, the extraction unit 15b outputs the extracted test item-relevant sentence. For example, the extraction unit 15b outputs, via the output unit 12 or the communication control unit 13, the extracted test item-relevant sentence to an extraction device that extracts a test item from a document to which a tag has been imparted. The extraction device uses statistical information on a test of an identical or similar portion to automatically extract the test item for grouped ranges indicated by the tag. In this way, the assistance apparatus 10 reduces an operation of close examination of the test item.

Figure 7:
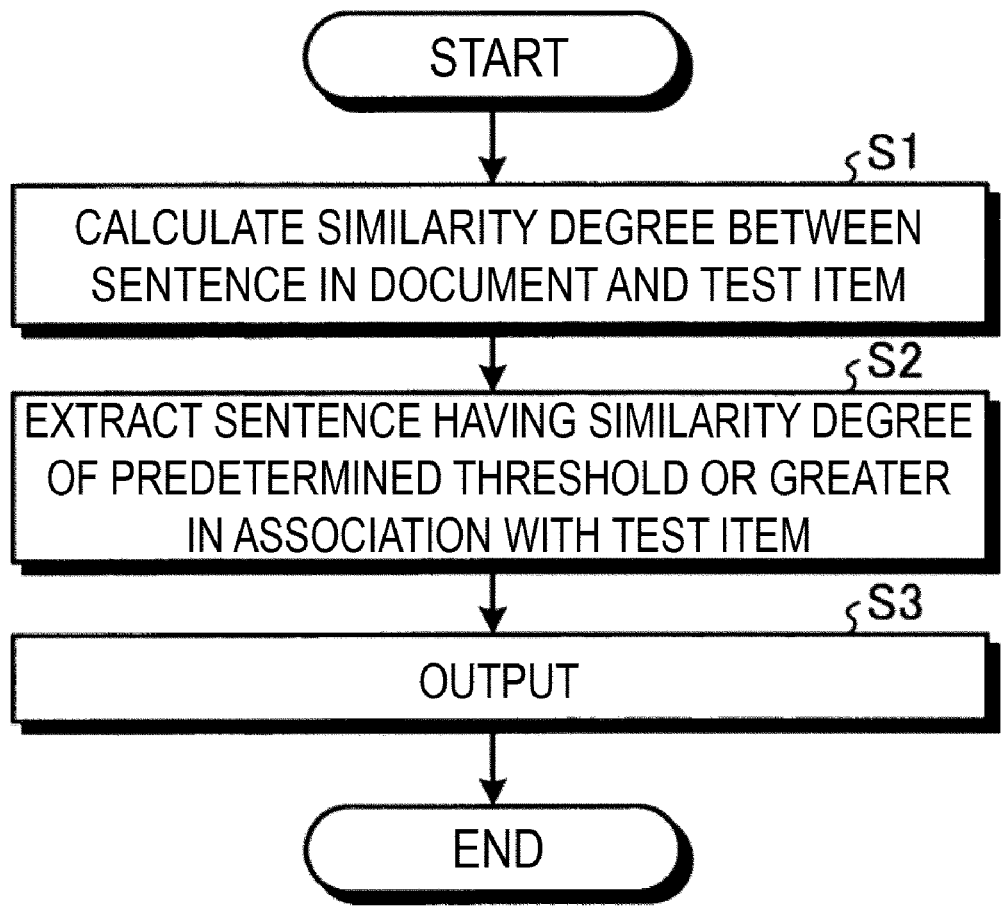
FIG. 7 is a flowchart illustrating an assistance processing procedure.

Assistance Processing Next, assistance processing executed by the assistance apparatus 10 according to the present embodiment will be described with reference to FIG. 7. FIG. 7 is a flowchart illustrating an assistance processing procedure. The flowchart of FIG. 7 starts, for example, at a timing at which a user inputs an operation of giving a start instruction.

First, the calculation unit 15a calculates a similarity degree between a sentence in a document and a document described correspondingly to a portion in the document. For example, the calculation unit 15a acquires a design document in which tags have been imparted and test items corresponding to the tags and calculates, for each of the test items corresponding to the imparted tags, a similarity degree between a sentence in the design document and the test item (step S1). For example, the calculation unit 15a calculates a similarity degree between a frequency of appearance of a word appearing in each sentence in the design document and a frequency of appearance of a word appearing in the test item.

Next, the extraction unit 15b extracts the sentence in the document in association with the document described correspondingly to the portion of the document when the calculated similarity degree is equal to or greater than a predetermined threshold. For example, when the calculated similarity degree is equal to or greater than the predetermined threshold, the extraction unit 15b extracts the sentence in the design document in association with the test item as a relevant sentence of the test item (step S2).

In addition, for a plurality of sentences written separately in the design document, when their similarity degrees to an identical test item are equal to or greater than the predetermined threshold, the extraction unit 15b groups and outputs the plurality of sentences as relevant sentences of the identical test item.

The extraction unit 15b outputs an extracted result (step S3). For example, the extraction unit 15b outputs, via the output unit 12 or the communication control unit 13, the extracted result to an extraction device that extracts a test item from a document in which a tag has been imparted. In this way, a series of processes is terminated.

As described above, the assistance apparatus 10 according to the present embodiment is the assistance apparatus 10 for assisting in describing a document corresponding to a portion of a document, and the calculation unit 15a calculates a similarity degree between a sentence of the document and the document described correspondingly to the portion of the document. In addition, when the calculated similarity degree is equal to or greater than the predetermined threshold, the extraction unit 15b extracts the sentence of the document in association with the document described correspondingly to the portion of the document.

This allows the assistance apparatus 10 to determine descriptions in ranges to which a substantially identical tag should be imparted in the document. Accordingly, a system or an operator of the system is able to easily extract an appropriate test item from the ranges to which the tag has been imparted in the document. In this manner, the assistance apparatus 10 can reduce operation of closely examining test items and assist in extracting an appropriate test item from the range to which the tag has been imparted in the document.

Furthermore, the calculation unit 15a calculates a similarity degree using a frequency of appearance of a word appearing in a sentence in a document and a frequency of appearance of a word appearing in a document described correspondingly to a portion of the document. This allows the assistance apparatus 10 to specifically calculate a similarity degree between each sentence in the document and a test item.

When similarity degrees between a plurality of sentences in a document and a document described correspondingly to a portion in the document are equal to or greater than a predetermined threshold, the extraction unit 15b groups the plurality of sentences and outputs the grouped plurality of sentences. This allows the assistance apparatus 10 to assist in more easily extracting a test item from ranges of a substantially identical tag.

Program

It is also possible to create a program in which processing executed by the assistance apparatus 10 according to the embodiment described above is described in a computer-executable language. As an embodiment, the assistance apparatus 10 can be implemented by installing an assistance program executing the above-described assistance processing in a desired computer as packaged software or online software. For example, an information processing apparatus can be made to function as the assistance apparatus 10 by causing the information processing apparatus to execute the above-described assistance program. The information processing apparatus mentioned here includes a desktop or laptop personal computer. Furthermore, as other examples, a mobile communication terminal such as a smartphone, a mobile phone, or a personal handyphone system (PHS), a slate terminal such as a personal digital assistant (PDA), and the like are included in the category of the information processing apparatus. In addition, the functions of the assistance apparatus 10 may be mounted in a cloud server.

Figure 8:
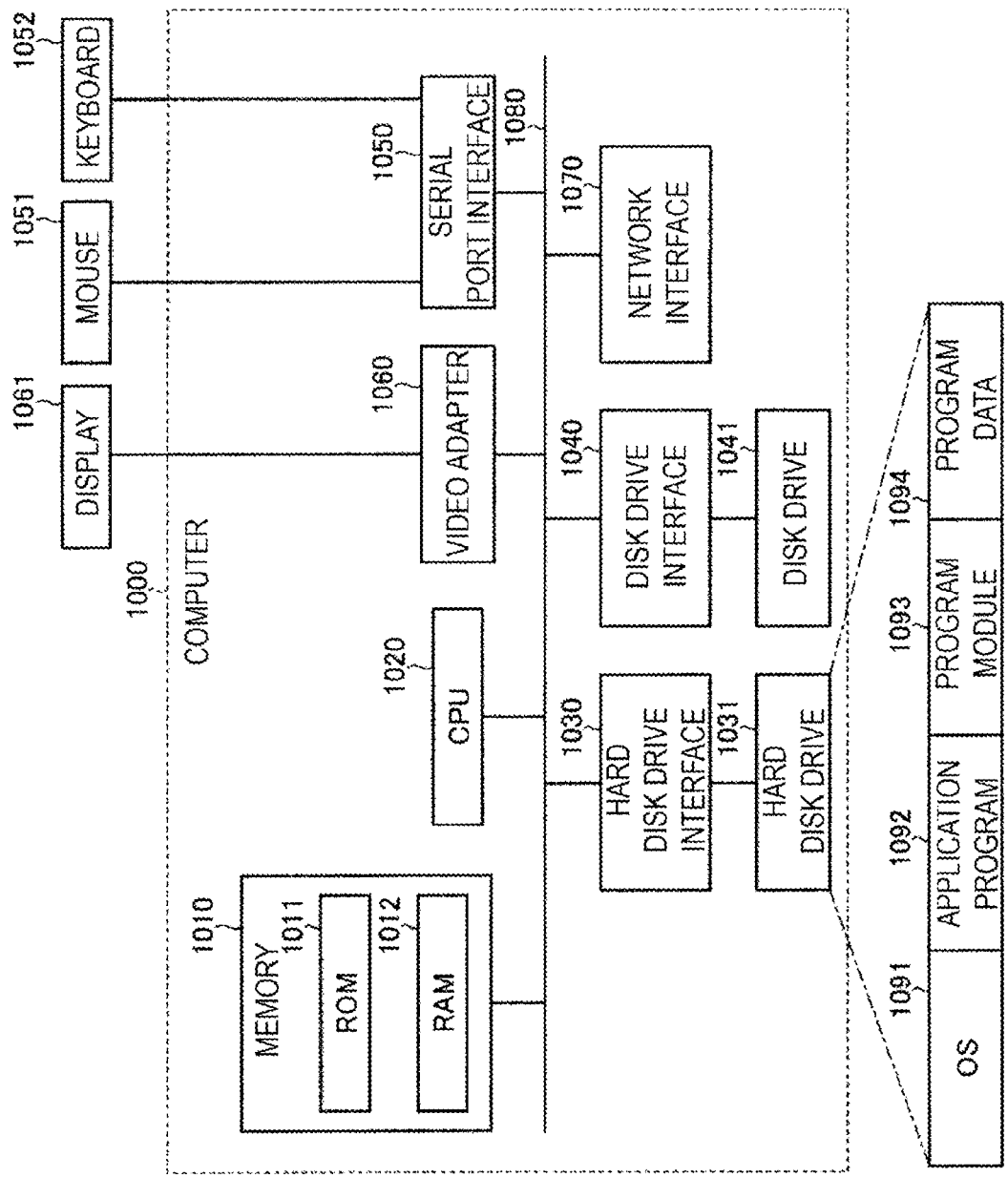
FIG. 8 is a diagram illustrating an example of a computer executing an assistance program.

FIG. 8 is a diagram illustrating an example of a computer executing the assistance program. A computer 1000 includes, for example, a memory 1010, a CPU 1020, a hard disk drive interface 1030, a disk drive interface 1040, a serial port interface 1050, a video adapter 1060, and a network interface 1070. These units are connected to each other through a bus 1080.

The memory 1010 includes a read only memory (ROM) 1011 and a RAM 1012. The ROM 1011 stores a boot program such as, for example, a basic input output system (BIOS). The hard disk drive interface 1030 is connected to a hard disk drive 1031. The disk drive interface 1040 is connected to a disk drive 1041. For example, a detachable storage medium such as a magnetic disk or an optical disc is inserted into the disk drive 1041. For example, a mouse 1051 and a keyboard 1052 are connected to the serial port interface 1050. For example, a display 1061 is connected to the video adapter 1060.

Here, the hard disk drive 1031 stores, for example, an OS 1091, an application program 1092, a program module 1093, and program data 1094. Each piece of information described in the aforementioned embodiment is stored in, for example, the hard disk drive 1031 and the memory 1010.

In addition, for example, the assistance program is stored in the hard disk drive 1031 as the program module 1093 in which commands to be executed by the computer 1000 are described. Specifically, the program module 1093 in which each processing executed by the assistance apparatus 10 described in the above-described embodiment is described is stored in the hard disk drive 1031.

Furthermore, data to be used in information processing according to the assistance program is stored, for example, in the hard disk drive 1031 as the program data 1094. Then, the CPU 1020 reads the program module 1093 and the program data 1094 stored in the hard disk drive 1031 into the RAM 1012 as needed and executes each of the aforementioned procedures.

Note that the program module 1093 and the program data 1094 related to the assistance program are not limited to being stored in the hard disk drive 1031. For example, the program module 1093 and the program data 1094 may be stored on a detachable storage medium and read by the CPU 1020 through the disk drive 1041 or the like. Alternatively, the program module 1093 and the program data 1094 related to the assistance program may be stored in another computer connected through a network such as a LAN or a wide area network (WAN) and read by the CPU 1020 through the network interface 1070.

Although the embodiment to which the invention made by the present inventors is applied has been described above, the present invention is not limited by the description and the drawings constituting a part of the disclosure of the present invention according to the present embodiment. In other words, all of other embodiments, examples, operation technologies, and the like made by those skilled in the art based on the present embodiment fall within the scope of the present invention.

REFERENCE SIGNS LIST

10 Assistance apparatus
11 Input unit
12 Output unit
13 Communication control unit
14 Storage unit
15 Control unit
15*a* Calculation unit
15*b* Extraction unit

The invention claimed is:

1. An assistance apparatus comprising one or more processors configured to:
   identify a portion of a document and impart a tag to the identified portion;
   extract one or more test items from the portion to which the tag has been imparted;
   calculate a similarity degree between i) each sentence included in the document and ii) each of the one or more test items;
   obtain a set of extracted sentences that are relevant sentences of the one or more test items comprising:
      for each sentence included in the document:
         determine that the similarity degree between the sentence and a corresponding test item included in the one or more test items is equal to or greater than a predetermined threshold; and
         extract the sentence in the document as a relevant sentence of the corresponding test item;
   identify, from the set of extracted sentences, a plurality of sentences whose similarity degrees to a same test item are equal to or greater than the predetermined threshold;
   group the plurality of sentences as relevant sentences of the same test item; and
   extract a second test item from the grouped plurality of sentences.

2. The assistance apparatus according to claim 1, configured to calculate the similarity degree using a frequency of appearance of a word appearing in the sentence in the document and a frequency of appearance of a word appearing in the one or more test items.

3. An assistance method performed in an assistance apparatus for assisting in describing a document corresponding to a portion in a document, the assistance method comprising:
   identifying a portion of a document and impart a tag to the identified portion;
   extracting one or more test items from the portion to which the tag has been imparted;
   calculating a similarity degree between i) each sentence included in the document and ii) each of the one or more test items;
   obtaining a set of extracted sentences that are relevant sentences of the one or more test items comprising:
      for each sentence included in the document:
         determining that the similarity degree between the sentence and a corresponding test item included in the one or more test items is equal to or greater than a predetermined threshold; and
         extracting the sentence in the document as a relevant sentence of the corresponding test item;

identifying, from the set of extracted sentences, a plurality of sentences whose similarity degrees to a same test item are equal to or greater than the predetermined threshold;
grouping the plurality of sentences as relevant sentences of the same test item; and
extracting a second test item from the grouped plurality of sentences.

4. A non-transitory computer readable medium storing one or more instructions causing, in processing for assisting in describing a document corresponding to a portion in a document, a computer to execute:
identifying a portion of a document and impart a tag to the identified portion;
extracting one or more test items from the portion to which the tag has been imparted;
calculating a similarity degree between i) each sentence included in the document and ii) each of the one or more test items;
obtaining a set of extracted sentences that are relevant sentences of the one or more test items comprising:
for each sentence included in the document:
determining that the similarity degree between the sentence and a corresponding test item included in the one or more test items is equal to or greater than a predetermined threshold; and
extracting the sentence in the document as a relevant sentence of the corresponding test item;
identifying, from the set of extracted sentences, a plurality of sentences whose similarity degrees to a same test item are equal to or greater than the predetermined threshold;
grouping the plurality of sentences as relevant sentences of the same test item; and
extracting a second test item from the grouped plurality of sentences.

5. The assistance method according to claim 3, comprising:
calculating the similarity degree using a frequency of appearance of a word appearing in the sentence in the document and a frequency of appearance of a word appearing in the one or more test items.

6. The non-transitory computer readable medium according to claim 4, wherein the one or more instructions cause the computer to execute:
calculating the similarity degree using a frequency of appearance of a word appearing in the sentence in the document and a frequency of appearance of a word appearing in the one or more test items.

* * * * *